United States Patent

Weinberger

Patent Number: 5,479,059
Date of Patent: Dec. 26, 1995

[54] THIN FILM SUPERCONDUCTOR MAGNETIC BEARINGS

[75] Inventor: Bernard R. Weinberger, Avon, Conn.

[73] Assignee: United Technologies Corporation, Hartford, Conn.

[21] Appl. No.: 110,448

[22] Filed: Aug. 23, 1993

[51] Int. Cl.$^6$ ............................. H02K 7/09; G11B 5/55
[52] U.S. Cl. ...................... 310/90.5; 310/156; 505/166
[58] Field of Search .................................. 310/90.5, 154, 310/156, 52; 505/166, 234–239, 701, 703, 833, 876–878

[56] References Cited

U.S. PATENT DOCUMENTS

| | | | |
|---|---|---|---|
| 4,797,386 | 1/1989 | Gyorgy et al. | 505/1 |
| 4,843,504 | 6/1989 | Barnes | 360/106 |
| 4,870,310 | 9/1989 | Triplett | 310/74 |
| 4,886,778 | 12/1989 | Moon et al. | 505/1 |
| 4,892,863 | 1/1990 | Agarwala | 505/1 |
| 4,926,082 | 5/1990 | Barnes | 310/90.5 |
| 4,939,120 | 7/1990 | Moon et al. | 505/1 |
| 4,956,571 | 9/1990 | Gordon et al. | 310/90.5 |
| 4,961,352 | 10/1990 | Downer et al. | 74/5.46 |
| 5,041,417 | 8/1991 | Agostinelli et al. | 505/1 |
| 5,106,823 | 4/1992 | Creuzet et al. | 505/1 |
| 5,126,317 | 6/1992 | Agarwala | 505/1 |
| 5,126,611 | 6/1992 | Armstrong et al. | 310/90.5 |
| 5,151,406 | 9/1992 | Sawada et al. | 505/1 |
| 5,177,387 | 1/1993 | McMichael et al. | 310/90.5 |
| 5,196,748 | 3/1993 | Rigney | 310/90.5 |
| 5,256,638 | 10/1993 | Weinberger et al. | 505/1 |
| 5,323,130 | 5/1994 | Shibayama et al. | 310/90.5 |
| 5,325,002 | 6/1974 | Rabinowitz et al. | 505/166 |
| 5,330,967 | 7/1994 | Takahata et al. | 505/166 |
| 5,408,108 | 4/1995 | Nakamura et al. | 505/193 |

FOREIGN PATENT DOCUMENTS 9303292  2/1993  WIPO.

OTHER PUBLICATIONS

International Search Report for PCT/US 94/08266, mailed Oct. 11, 1994; for the PCT application that corresponds to United States Application 8/110,448 (the present application).
WO-A1 90/03524 to Eastman Kodak Company, published 5 Apr. 1990.
WO-A1 92/10871 to University of Houston, published 25 Jun. 1992.
WO-A1 92/21175 to University of Houston, published 26 Nov. 1992.
EP-A1 467 341 to Koyo Seiko Co., Ltd., published 22 Jan. 1992.
EP-A1 322 693 to Kernforschungsanlage Jülich GmbH, published 5 Jul. 1989. directed to a magnetic bearing with a component (either the rotor or stator) that is permanently magnetic and a component (either the rotor or stator) made from a superconducting material.
"Practical Adaptation in Bulk Superconducting Magnetic Bearing Application," by C. K. McMichael et al., published in *Appl. Phys. Lett.*, vol. 60, 13 Apr. 1991, pp. 1893–1895.

(List continued on next page.)

Primary Examiner—Steven L. Stephan
Assistant Examiner—D. R. Haszko
Attorney, Agent, or Firm—George J. Romanik

[57] ABSTRACT

A superconductor magnetic bearing includes a shaft (10) that is subject to a load (L) and rotatable around an axis of rotation, a magnet (12) mounted to the shaft, and a stator (14) in proximity to the shaft. The stator (14) has a superconductor thin film assembly (16) positioned to interact with the magnet (12) to produce a levitation force on the shaft (10) that supports the load (L). The thin film assembly (16) includes at least two superconductor thin films (18) and at least one substrate (20). Each thin film (18) is positioned on a substrate (20) and all the thin films are positioned such that an applied magnetic field from the magnet (12) passes through all the thin films. A similar bearing in which the thin film assembly (16) is mounted on the shaft (10) and the magnet (12) is part of the stator (14) also can be constructed.

20 Claims, 4 Drawing Sheets

OTHER PUBLICATIONS

"Effects of Material Processing in High Temperature Superconducting Magnetic Bearings," by C. K. McMichael et al., published in *Appl. Phys. Lett.*, vol. 59, No. 19, 4 Nov. 1991 at pp. 2442–2444.

"TEF/1NSK Team Develop 'Attractive' High $T_o$ Bearing," published in *Superconductor Week*, vol.5, No., 36, Oct. 14, 1991 at p. 1.

"Japanese High on Flywheels," published in *Superconductor Industry*, Fall 1991 at p. 38.

"Magnetic Bearing Model Using Yttrium–Based Superconductor," publication information unavailable.

"Characterization of High–Temperature Superconducting Bearing," by T. Yotsua et al., publication information unavailable.

Magnetic Forces in High–$T_o$ Superconducting Bearings, by F. C. Moon, published in *Applied Electromagnetics in Materials*, vol. 1 (1990) at pp. 29–35.

High–speed Rotation of Magnets on High $T_o$ Superconducting Bearings, by F. C. Moon et al., published in *Appl. Phys. Lett.*, vol. 56 (4), 22 Jan. 1990, at pp. 397–399.

Magnetic Leviation in a Cylindrical Superconductor, by T. Hasebe et al., published in *International Journal of Applied Electromagnetics in Materials*, vol. 2 (1991) at pp. 221–225.

Superconducting Actuator Design, by M. Komori et al., published in *International Journal of Applied Electromagnetics in Materials*, vol. 2 (1991) at pp. 243–252.

THIN FILM SUPERCONDUCTOR MAGNETIC BEARINGS

This invention was made with Government support under Argonne National Laboratory contract number 85109 awarded by the Department of Energy. The Government has certain rights in this invention.

TECHNICAL FIELD

The present invention is directed to superconductor magnetic bearings, particularly bearings that incorporate thin films of high temperature superconductor material.

BACKGROUND ART

A wide variety of bearings for rotating machinery, ranging from conventional bearings to noncontact bearings, are available. Conventional bearings, in which bearings physically contact a rotating device, are subject to many well known problems. These problems include frictional energy losses and mechanical wear.

Noncontact bearings, such as magnet bearings, overcome problems with friction and mechanical wear, but introduce other problems. For example, permanent magnet bearings are inherently unstable. As a result, they require external mechanical means to stabilize them in at least one degree of freedom. Electromagnet bearings, on the other hand, can be made inherently stable with position sensors and electronic feedback control loops. The electromagnets in the bearings, however, require a power source and a means for cooling their windings. As a result, electromagnet bearings can be impractical for many applications.

Superconductor magnetic bearings have been proposed as improvements to permanent magnet and electromagnet bearings. For example, U.S. Pat. Nos. 4,886,778 and 4,939,120, both to Moon et al., and commonly-owned U.S. Pat. No. 5,214,981, to Weinberger et al., describe several prior art superconductor bearings that use high temperature superconductors (HTS). In these bearings, which are assemblies of suitably arranged superconductor structures and permanent magnets, the superconductors and magnetic fields from the magnets interact to produce levitation forces. The interaction can be the result of the Meissner effect, magnetic flux pinning effects, or a combination of the two. Meissner effect forces are produced when a magnetic field of a permanent magnet is expelled by a superconductor from its interior. The magnitude of the Meissner effect forces is proportional to the fraction of the expelled magnetic flux. In weak magnetic fields, such as fields below the lower critical field ($H_{c1}$), and at temperatures well below the critical temperature ($T_c$), the superconductor can successfully expel all the external magnetic flux from its interior, except for the portion of the interior within a small distance (the London penetration depth) of its surface. If the dimensions of the superconductor are small with respect to the London penetration depth, the portion of the superconductor from which flux is excluded will be small compared to the portion of the superconductor in which flux penetration occurs. As a result, the Meissner levitation forces in such superconductors may be weak. Therefore, the dimensions of the superconductor should be large with respect to the penetration depth to obtain adequate levitation forces. At higher magnetic fields (e.g., $H>H_{c1}$), flux will penetrate beyond the London penetration depth in the form of discrete flux quanta. Under such circumstances, there may be reason to expand the dimensions of the superconductor even further.

The superconductor structures in superconductor bearings are usually made from bulk, polycrystalline monoliths of HTS material. Maximizing the levitation forced produced by a superconductor using simple Meissner effect levitation requires the exclusion of as much of an externally applied magnetic flux as possible from the superconductor. Cracks and grain boundaries in such materials, however, can allow magnetic fields to penetrate the material without flowing through crystalline grains. As a result, the effective penetration depth of a bulk HTS material may be many times its London penetration depth. Therefore, bulk materials ordinarily must be at least about 2 mm to about 8 mm thick (many times their London penetration depths) to achieve adequate levitation forces.

To overcome the problems created by cracks and grain boundaries in bulk HTS materials, thin film HTS materials have been proposed as substitutes. Thin film materials can be grown as single crystal, epitaxial films on a variety of substrates. Therefore, using simple Meissner effect levitation, HTS thin films can achieve levitation forces equivalent to those produced by much thicker bulk materials. In addition, HTS thin films can pin trapped vortices of magnetic flux more effectively than bulk materials of the same nominal composition. The superior flux pinning of HTS thin films can enhance the stiffness of the trapped flux, field cooled bearings described in commonly-owned, allowed U.S. patent application No. 07/791,834 by Weinberger et at. Bearing stiffness ($\Delta F/\Delta z$), a critical parameter in bearing design, is the restoring force generated per unit displacement of the bearing rotor and stator from their equilibrium positions. Moreover, epitaxial films may be crystallographically oriented to point a preferred axis in the direction of the applied magnetic field. Such orientation can further enhance the flux pinning capabilities of anisotropic superconductors, such as $YBa_2Cu_3O_{7-\delta}$.

A further benefit of using HTS thin films in magnetic bearings may be the ability to use the geometric "demagnetization effect" to enhance levitation forces. Contrary to what the name of the effect implies, the demagnetization effect in HTS thin films amplifies the applied magnetic field and generates levitation forces that are appreciably larger than would be expected if the effect were ignored. FIG. 1 shows how this effect works. When a HTS thin film 2 is placed in an applied magnetic field ($H_a$), $H_a$ induces a magnetization in the film. Because the Meissner effect in superconductors is diamagnetic, the induced magnetization ($M_i$) is opposite to $H_a$. As shown, the magnetic field lines from $M_i$ that flow between any segment 4 of the thin film 2 and any other segment 6 of the thin film reinforce $H_a$ because they approach the thin film in the same direction as $H_a$. The field lines generated by segment 4, however, do not affect segment 4 itself. Rather, segment 4 is affected by induced field lines generated by other segments of the thin film 2. As a result, the total field to which the thin film 2 is exposed is much larger than $H_a$ alone. Therefore, the levitation force produced by the thin film 2 is larger than would be expected from considering only $H_a$. The magnitude of the demagnetization effect is a function of the orientation and aspect ratio (length to thickness ratio) of the film 2 with respect to the direction of $H_a$. The demagnetization effect provides its maximum benefit for a high aspect ratio thin film positioned perpendicular to $H_a$ as in FIG. 1. The geometric magnification of $H_a$ within the thin film 2 does not, by itself, result in leviation forces superior to those produced by bulk materials. Rather, the geometric magnification of $H_a$ in thin films produces equivalent forces with far less superconducting material and allows for the exploitation of the superior crystallinity, orientation, critical current, and flux pinning properties of HTS thin films. As a result, the size of a HTS thin film bearing can be reduced and the cryogenic engineering greatly simplified compared to a bearing made with a bulk HTS material.

As mentioned above, HTS thin films should be several times thicker than their London penetration depths to produce adequate levitation forces. This means they should be on the order of several microns thick. Because thin films lose epitaxial register with their substrates as they become thicker, however, it is extremely difficult to grow suitable films to thicknesses greater than about 1 μm. As a result, thin films cannot easily be used to their full potential in superconductor magnetic bearings with prior art methods. Therefore, what is needed in the industry are thin film HTS bearings that produce larger levitation forces than can be achieved with prior art thin film bearings.

DISCLOSURE OF THE INVENTION

The present invention is directed to thin film HTS bearings that produce larger levitation forces than can be achieved with prior art thin film bearings.

One aspect of the invention includes a superconductor magnetic bearing with a shaft that is subject to a load and rotatable around an axis of rotation, a magnet mounted to the shaft, and a stator in proximity to the shaft. The stator has a superconductor positioned to interact with the magnet to produce a levitation force on the shaft that supports the load. The superconductor includes a superconductor thin film assembly that has at least two superconductor thin films anti at least one substrate. Each thin film is positioned on a substrate and all the thin films are positioned such that an applied magnetic field from the magnet passes through all the thin films.

Another aspect of the invention includes a bearing similar to that described above in which the superconductor thin film assembly is mounted on the shaft and the magnet is part of the stator.

These and other features and advantages of the present invention will become more apparent from the following description and accompanying drawing.

BEST MODE FOR CARRYING OUT THE INVENTION

Figure 1:
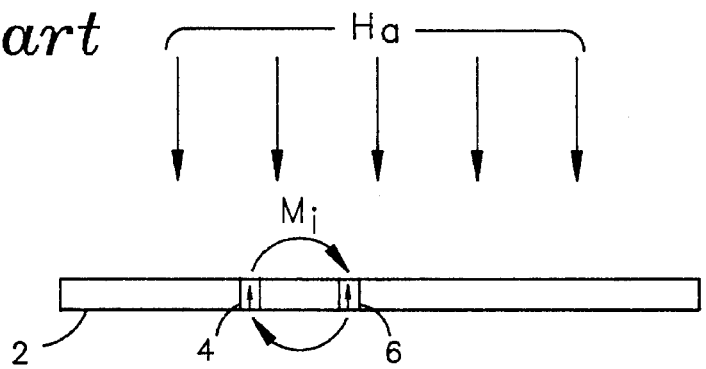
FIG. 1 is a diagram that shows how the demagnetization effect produces an induced magnetization ($M_i$) that amplifies an applied magnetic field ($H_a$) in a thin film, high temperature superconductor.
Figure 2:
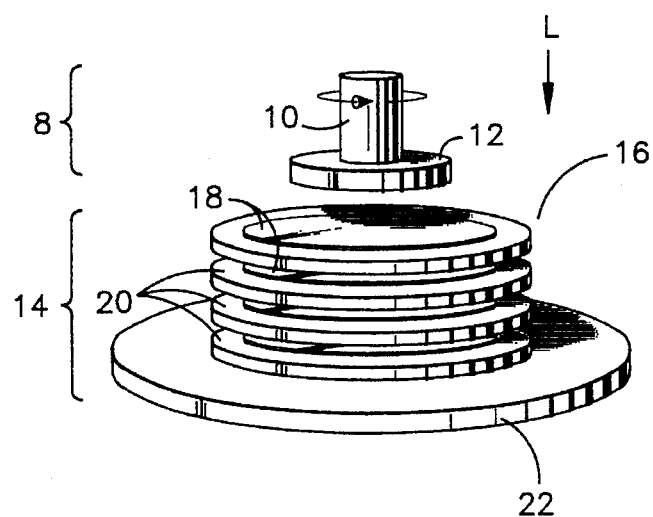
FIG. 2 is a perspective view of a thrust bearing of the present invention.

FIG. 2 shows a simple embodiment of a thrust bearing of the present invention. The bearing has a rotor 8 that includes a shaft 10, which rotates around an axis of rotation, and a magnet 12. Because the bearing is a thrust bearing, the shaft 10 is subject to a load L directed axially along the shaft. The bearing also has a stator 14 in proximity to the shaft. The stator 14 comprises a superconductor thin film assembly 16 that in turn comprises at least two high temperature superconductor (HTS) thin films 18 positioned on at least one substrate 20. The HTS thin films 18 interact with an applied field from the magnet 12 to produce a levitation force on the shaft 10 that supports the load L. The thin films 18 are positioned in the thin film assembly 16 so the applied magnetic field passes though each film. As a result, the thin films 18 in the assembly 16 respond to the field as if they were a single film. To achieve this effect, the thin films 18 may be stacked as in FIG. 2 or positioned in some other suitable way that allows the applied magnetic field to pass through all the films in the thin film assembly 16. Preferably, the thin films 18 will contact adjoining films and/or substrates 20, although the bearing will function if there are gaps in the thin film assembly 16.

The HTS thin films 18 can be made from any HTS material that can be formed as a thin film. Preferably, the thin films 18 will be made from a HTS material that has a critical temperature ($T_c$) above 77K so they can be cooled to the superconducting state with liquid nitrogen. If another cryogen is used, the superconductor's $T_c$ should be higher than the cryogen's boiling point. For example, if liquid oxygen is the cryogen, the superconductor should have a $T_c$ higher than 90K. Suitable HTS materials include Y-Ba-Cu-O, Bi-Sr-Ca-Cu-O, Tl-Ba-Ca-Cu-O, and similar materials. Bi-Sr-Ca-Cu-O materials in which Pb is substituted for a portion of the Bi are also suitable. The thin films 18 can be made with any method known for making HTS thin films, such as laser ablation, sputtering, electron beam evaporation, sol gel methods, or any other suitable method. Methods that make superconductors with a high density of strong pinning centers are especially desirable. As an alternative to custom fabrication, the HTS thin films 18 may be purchased from a commercial supplier. Suitable HTS thin films may be purchased from Excel Superconductor, Inc. (Bohemia, N.Y.), Conductus (Sunnyvale, Calif.), and other suppliers.

Each HTS thin film 18 may be made as thick as possible without losing its single crystal, epitaxial, and/or oriented properties. Preferably, each thin film 18 will be up to about 1 μm thick. The total thickness of all the HTS films should adequate to produce a levitation force that supports the load L. Preferably, the total thickness of the HTS films 18 will be several times the London penetration depth at the temperature at which the bearing operates. For example, the total thickness of $YBa_2Cu_3O_{7-\delta}$ thin films in a bearing that operates at 77K may be about 1.5 μm or thicker. If the films 18 have a preferred orientation, the films should be oriented so a preferred crystalline axis presents itself to the field produced by the magnet 12.

The substrate 20 may be any material on which HTS thin films 18 can be grown. Preferably, the substrate 20 will allow the growth of epitaxial HTS films and have a low electrical conductivity. A low electrical conductivity reduces eddy current losses that can result from placing the substrate in a spinning magnetic field. Suitable substrates include LaAlO$_3$, SrTiO$_3$, and surface passivated silicon. Alternately, the substrate may be a material with a high thermal conductivity, such as sapphire, to aid in cooling the HTS films 18. The substrate 20 should be as thin as possible to provide a short thermal conduction path while providing adequate mechanical strength during the film deposition and bearing assembly processes. For example, the substrates may be about 0.05 mm to about 2 mm thick. Preferably, the substrates will be about 0.1 mm to about 0.5 mm thick. Any number of substrates 20 may be used to build a thin film assembly 16 having a desired total thin film thickness. If desired, HTS films 18 can be deposited on both the front and back sides of a substrate 20 to decrease the number of substrates needed and the overall thickness of the thin film assembly 16.

Figure 3:
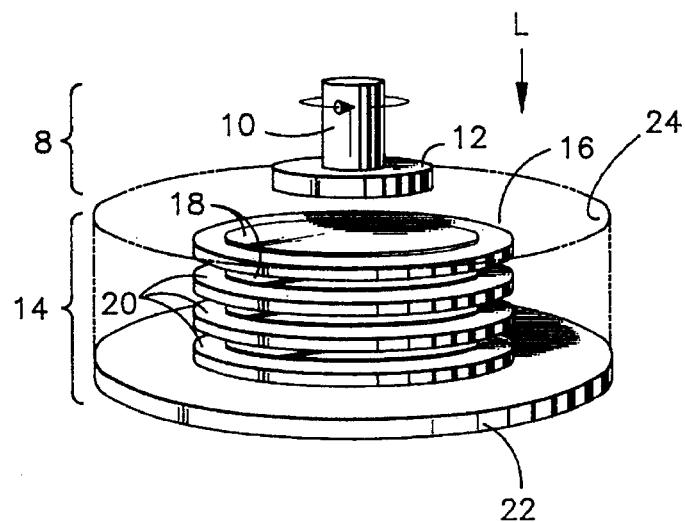
FIG. 3 is a perspective view of an alternate embodiment of a thrust bearing of the present invention.
Figure 4:
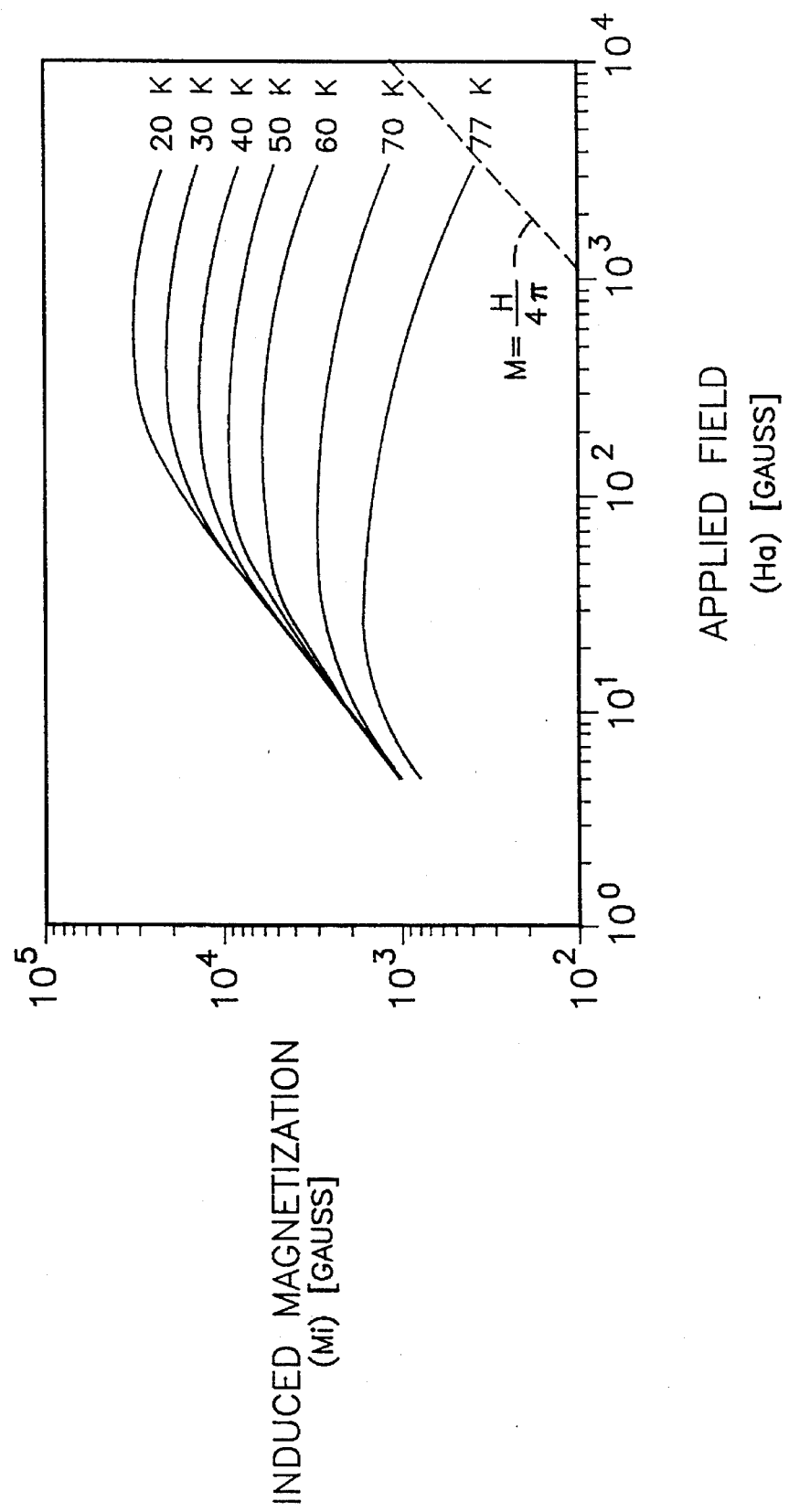
FIG. 4 is a graph of $H_t$ versus $H_a$ for a $YBa_2Cu_3O_{7-\delta}$ high temperature superconductor at temperatures between 20K and 77K.

The HTS thin films 18 may be cooled below their $T_c$s with any convenient cooling means. In the embodiment of FIG. 2, cooling is provided by conduction from a cold plate 22 to which the thin film assembly 16 is thermally bonded. Conduction can be facilitated if the substrates 20 in the assembly 16 are a good thermal conductors. The cold plate 22 may be the cold stage of a cryocooler, a boundary of a liquid cryogen reservoir, or any other suitably cold surface. Alternately, the thin film assembly 16 may be immersed directly in a liquid cryogen 24 as in FIG. 3. Although the HTS thin films 18 may be cooled to any temperature below their $T_c$, temperatures somewhat lower than $T_c$ are preferred to enhance the Meissner effect and flux pinning capabilities of the HTS film. As FIG. 4 shows, the temperature dependence of the induced magnetization ($M_i$) induced in HTS materials (here YBa$_2$Cu$_3$O$_{7-\delta}$) by the applied magnetic field ($H_a$) is very strong. Therefore, even a relatively small decrease in operating temperature can yield a significant increase in $M_i$, hence a significant increase in levitation force.

Figure 5:
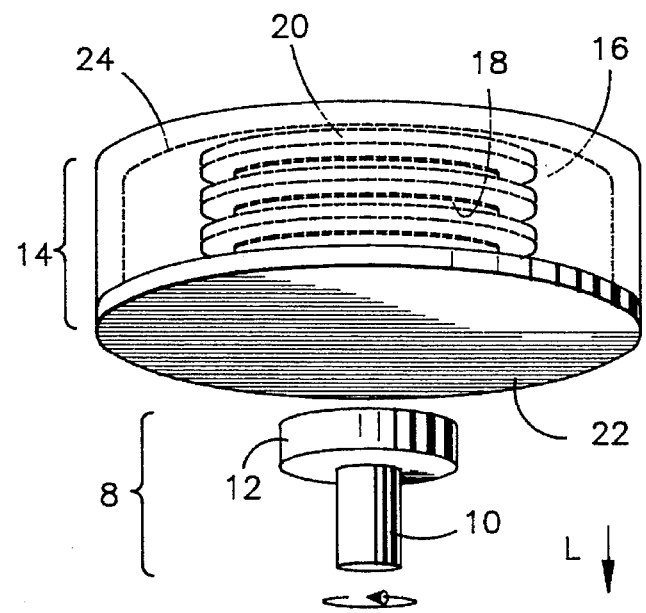
FIG. 5 is a perspective view of another embodiment of a thrust bearing of the present invention.

Other bearing configurations are, of course, within the scope of the present invention. FIG. 5 shows a thrust bearing that relies on the strong flux pinning available in HTS thin films 18 and an appropriate field cooling protocol to suspended the rotor 8 beneath the stator 14. A suitable protocol for a bearing with YBa$_2$Cu$_3$O$_{7-\delta}$ thin films 18 may be to cool films to about 60K in the presence of a rare-earth permanent magnet (e.g., Sm-Co or Nd-Fe-B).

Figure 6:
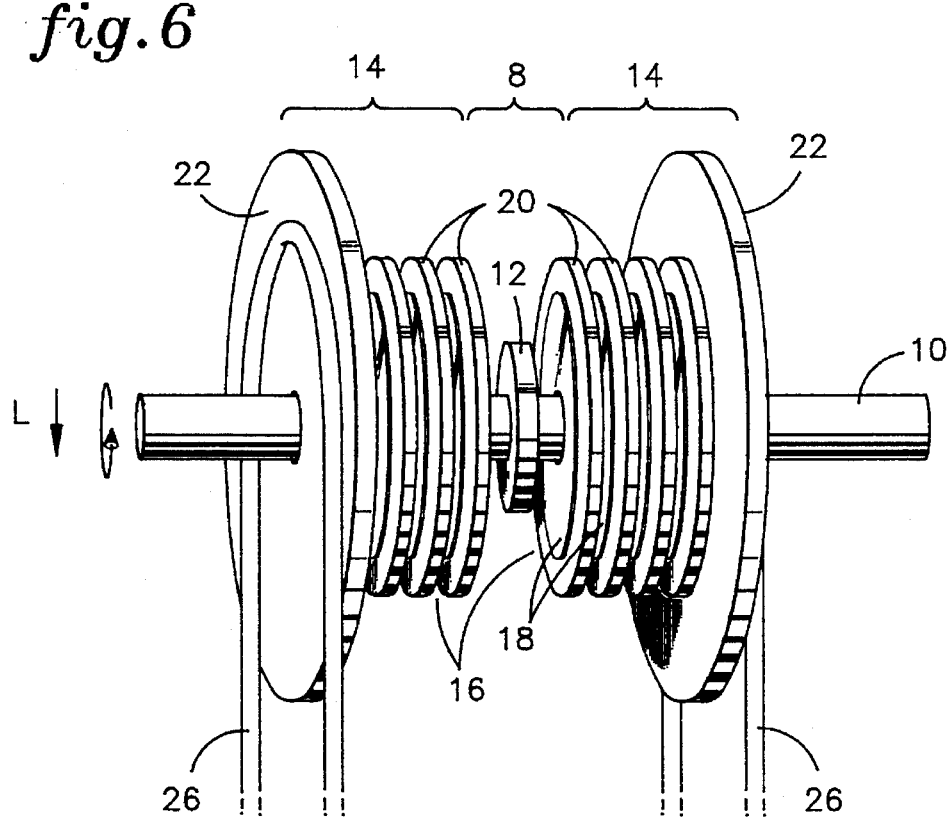
FIG. 6 is a perspective view of a journal bearing of the present invention.

FIG. 6 shows a journal bearing that supports a load L directed radially along the shaft 10. The magnet 12 is suspended between two stators 14, each of which comprises a superconductor thin film assembly 16 thermally bonded to a cold plate 22. The shaft 10 passes through holes in the cold plates 22 and thin film assemblies 16. The cold plates 22 are cooled by circulating a liquid cryogen through ducts 26 that also are thermally bonded to the cold plates 22. This bearing uses flux pinning forces described in commonly-owned, allowed U.S. patent application No. 07/791,834 by Weinberger et al., the disclosure of which is herein incorporated by reference in its entirety, to produce an attractive force between the HTS films 18 and magnet 12 directed parallel to the load L to support the load. The HTS films 18 and magnet 12 also produce a repulsive force perpendicular to the load L that maintains the separation between the rotor 8 and stators 14.

Another set of alternate bearing configurations can be produced by mounting the thin film assembly 16 on the shaft 10 and mounting the magnet 12 on the stator 14. The thin film assembly 16 in such a bearing can be cooled by any convenient means, such as by immersing it in a liquid cryogen.

The following examples demonstrate the present invention without limiting the invention's broad scope.

EXAMPLE 1

Figure 7:
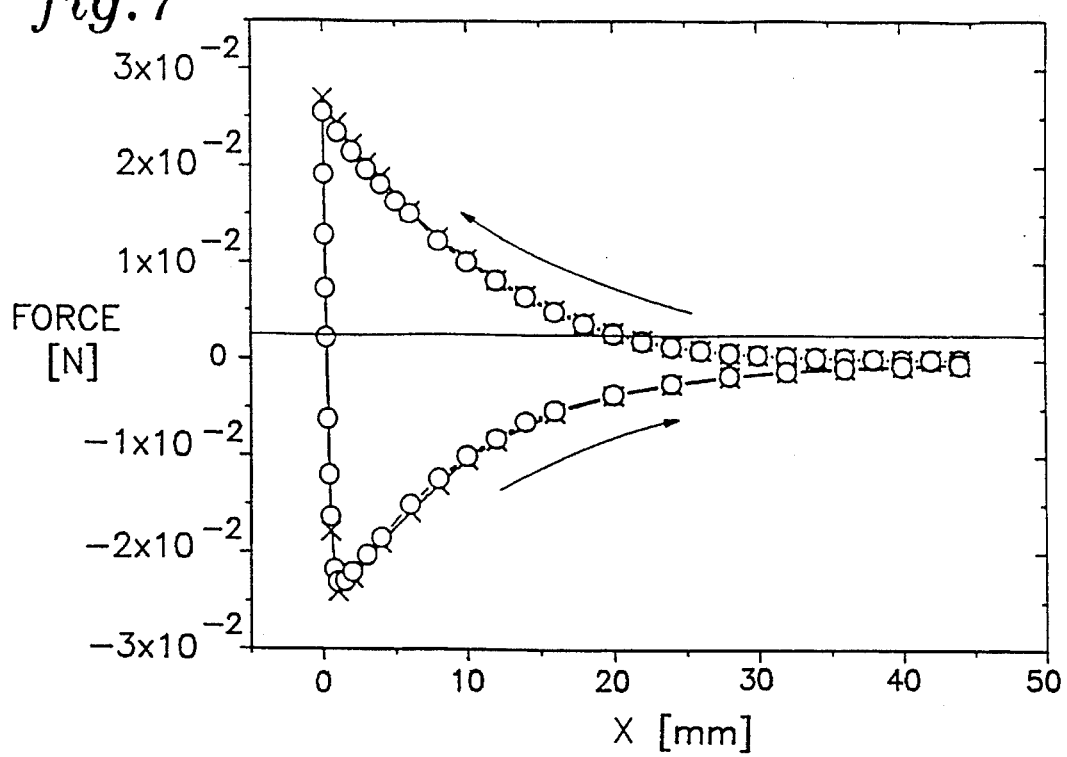
FIG. 7 is a graph that compares the forces generated by a thin film assembly having a single substrate with HTS thin films on both sides and a thin film assembly having two substrates, each with a single HTS film, as a function of distance between the thin film assemblies and a magnet.

Two sets of two HTS thin films were purchased from Excel Superconductor, Inc. (Bohemia, N.Y.). Each film comprised laser ablated, c-axis oriented YBa$_2$Cu$_3$O$_{7-\delta}$ and had dimensions of 1.0 cm×1.0 μm×0.65 μm. One set of thin films was positioned on either side of a single LaAlO$_3$ substrate. The other set of thin films comprised two LaAlO$_3$ substrates, each with a single superconductor thin film, arranged to form a thin film assembly. The substrates were 0.5 mm thick. The sets of thin films were independently cooled to their superconducting states in zero applied field by immersing them in liquid nitrogen at 77K. The thin films were then exposed to an applied field from a 1.9 cm diameter Nd-Fe-B magnet and the levitation forces between the magnet and thin films at various magnet/thin film spacings were measured with an analytical balance. The data for both sets of thin films are shown in FIG. 7. The X=0 position corresponds to an applied field at the surface of the film of 1.1 kG. Data for the thin film assembly with two films and one substrate are represented by crosses. Data for the thin film assembly with two films and two substrates are represented by circles. The data show that the responses of the thin film assemblies to the magnetic field were nearly identical.

EXAMPLE 2

Five thin film assemblies were made from laser ablated, c-axis oriented YBa$_2$Cu$_3$O$_{7-\delta}$ thin films and 0.5 mm thick LaAlO$_3$ substrates purchased from Excel Superconductor, Inc. The assemblies were arranged as follows:

| Assembly | Arrangement | Total Film Thickness μm |
| --- | --- | --- |
| 1 | One 0.2 μm film on a single substrate | 0.2 |
| 2 | One 0.5 μm film on a single substrate | 0.5 |
| 3 | Two 0.5 μm films on two substrates | 1.0 |
| 4 | Three 0.5 μm films on three substrates | 1.5 |
| 5 | Five 0.5 μm films on five substrates | 2.5 |

Figure 8:
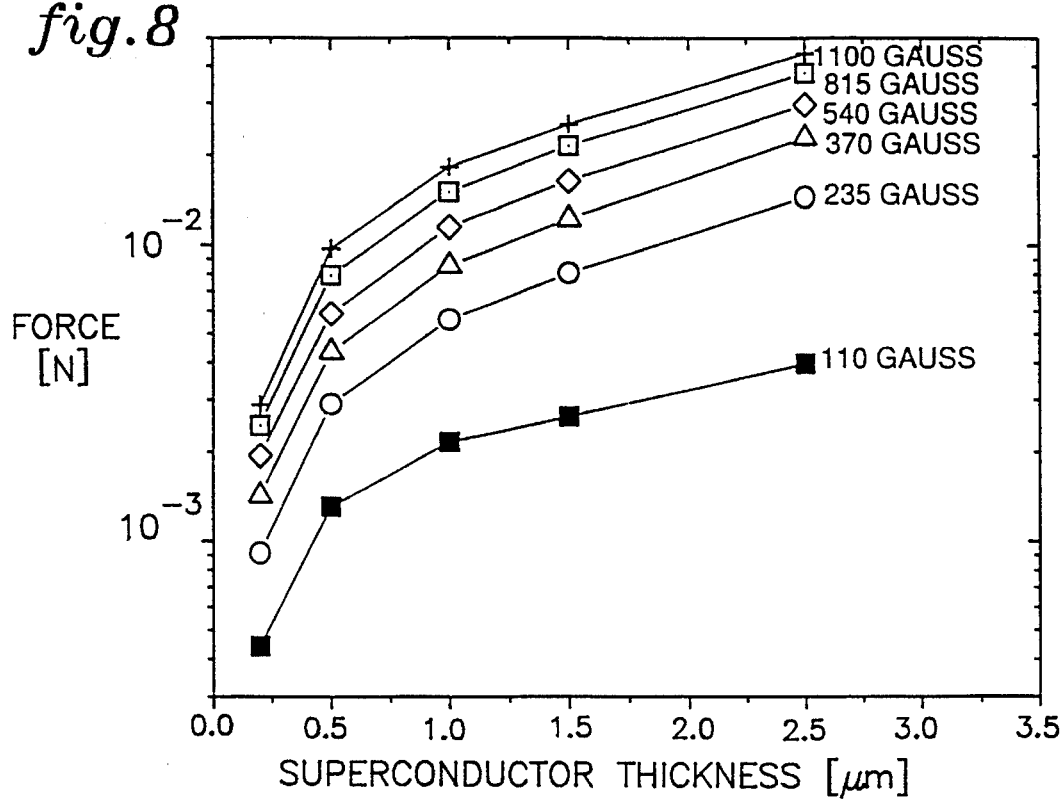
FIG. 8 is a graph of the force produced by thin film assemblies of various thicknesses in several applied magnetic fields.

The levitation force generated by each thin film assembly in response to applied magnetic fields of 110 G, 235 G, 370 G, 540 G, 815 G, and 1100 G from a Nd-Fe-B magnet was measured with an analytical balance. The different applied fields were generated by changing the separation between the thin film assemblies and the same magnet. Because the applied fields varied spatially across the assemblies, the strengths of the fields are reported as values measured near the center of the thin films. FIG. 8 shows the levitation forces measured at 77K for the five thin film assemblies. The superconductor thickness corresponds to the total film thickness reported in the table above. This data clearly demonstrates the benefit of the enhanced levitation force, obtained by using total superconductor thicknesses greater than 1.0 μm. The minimum thickness required to produce the optimal levitation force will be a function of the temperature of the thin film assembly.

The bearings of the present invention are suitable for a wide variety of applications and provide several benefits over the prior art. For example, the thin film assemblies of the present invention can produce larger levitation forces than prior art thin films because they are thicker than is practical for prior art films. In addition, the thin films of the present invention can simplify the cryogenic engineering required to maintain the HTS below $T_c$ because they are compatible with a variety of cooling mechanisms (e.g., cooling by thermal conduction via a cold, direct immersion in a liquid cryogen, etc.)

The invention is not limited to the particular embodiments shown and described herein. Various changes and modifications may be made without departing from the spirit or scope of the claimed invention.

I claim:

1. A superconductor magnetic bearing, comprising:
   a shaft rotatable around an axis of rotation, wherein the shaft is capable of being subjected to a load,
   a magnet mounted to the shaft,
   a stator in proximity to the shaft, wherein the stator comprises a superconductor positioned to interact with the magnet to produce a levitation force on the shaft that supports the load,
   characterized in that:
   the stator comprises a superconductor thin film assembly having at least two superconductor thin films and at least one substrate, wherein each thin film is a single crystal and is positioned on a substrate and all the thin films are positioned such that an applied magnetic field from the magnet is able to pass through all the thin films.

2. The bearing of claim 1, wherein at least one substrate has a front side and a back side and thin films are positioned on both the front side and back side.

3. The bearing of claim 1, wherein the thin film assembly comprises three or more thin films and two or more substrates.

4. The bearing of claim 1, wherein the total thickness of the thin films is greater than the London penetration depth of the superconductor from which the thin films are made.

5. The bearing of claim 1, wherein the total thickness of the thin films is at least about 1 μm.

6. The bearing of claim 1, wherein the thin films comprise a superconductor having a critical temperature greater than 77K.

7. The bearing of claim 1, wherein the substrate comprises $LaAlO_3$, $SrTiO_3$, or surface passivated silicon.

8. The bearing of claim 1, wherein the substrate comprises sapphire.

9. The bearing of claim 1, wherein the thin film assembly is thermally bonded to a cold plate.

10. The bearing of claim 9, wherein the cold plate is a cold stage of a cryocooler or a boundary of a liquid cryogen reservoir.

11. The bearing of claim 1, wherein the thin film assembly is immersed in a liquid cryogen.

12. A superconductor magnetic bearing, comprising:
    a stator that comprises a magnet,
    a shaft rotatable around an axis of rotation, wherein the shaft is capable of being subjected to a load,
    a superconductor mounted to the shaft in proximity to the stator, wherein the superconductor is positioned the interact with the magnet to produce a levitation force on the shaft that supports the load,
    characterized in that:
    the superconductor comprises a superconductor thin film assembly having at least two superconductor thin films and at least one substrate, wherein each thin film is a single crystal and is positioned on a substrate and all the thin films are positioned such that an applied magnetic field form the magnet is able to pass through all the thin films.

13. The bearing of claim 12, wherein at least one substrate has a front side and a back side and thin films are positioned on both the front side and back side.

14. The bearing of claim 12, wherein the thin film assembly comprises three or more thin films and two or more substrates.

15. The bearing of claim 12, wherein the total thickness of the thin films is greater than the London penetration depth of the superconductor from which the thin films are made.

16. The bearing of claim 12, wherein the total thickness of the thin films is at least about 1 μm.

17. The bearing of claim 12, wherein the thin films comprise a superconductor having a critical temperature greater than 77K.

18. The bearing of claim 12, wherein the substrate comprises $LaAlO_3$, $SrTiO_3$, or surface passivated silicon.

19. The bearing of claim 12, wherein the substrate comprises sapphire.

20. The bearing of claim 12, wherein the thin film assembly is immersed in a liquid cryogen.

* * * * *

UNITED STATES PATENT AND TRADEMARK OFFICE
CERTIFICATE OF CORRECTION

PATENT NO. : 5,479,059
DATED : Dec. 26, 1995
INVENTOR(S) : Bernard R. Weinberger It is certified that error appears in the above-indentified patent and that said Letters Patent is hereby corrected as shown below:

Column 3, line 31: "anti" should be --and--.

Column 6, line 6: "1.0 cm x 1.0 µm x 0.65 µm" should be
--1.0 cm x 1.0 cm x 0.65 µm--.

Column 8, line 12: "is positioned the" should be
--is positioned to--.

Signed and Sealed this

Twenty-eighth Day of May, 1996

Attest:

BRUCE LEHMAN

*Attesting Officer*   *Commissioner of Patents and Trademarks*